(12) United States Patent
MacLaurin et al.

(10) Patent No.: US 7,680,835 B2
(45) Date of Patent: Mar. 16, 2010

(54) ONLINE STORAGE WITH METADATA-BASED RETRIEVAL

(75) Inventors: Matthew B MacLaurin, Woodinville, WA (US); Andrzej Turski, Redmond, WA (US); Cezary Marcjan, Redmond, WA (US); Lili Cheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 276 days.

(21) Appl. No.: 11/079,613

(22) Filed: Mar. 14, 2005

(65) Prior Publication Data

US 2006/0206533 A1 Sep. 14, 2006

Related U.S. Application Data

(60) Provisional application No. 60/657,530, filed on Feb. 28, 2005.

(51) Int. Cl.
*G06F 12/00* (2006.01)

(52) U.S. Cl. .......................... 707/201; 707/10; 709/248

(58) Field of Classification Search ................ 707/201, 707/200, 10; 709/248
See application file for complete search history.

(56) References Cited

U.S. PATENT DOCUMENTS

| | | | | |
|---|---|---|---|---|
| 6,240,416 | B1 * | 5/2001 | Immon et al. .................. | 707/10 |
| 6,493,720 | B1 * | 12/2002 | Chu et al. ................. | 707/104.1 |
| 6,938,042 | B2 * | 8/2005 | Aboulhosn et al. ............ | 707/10 |
| 6,944,612 | B2 * | 9/2005 | Roustant et al. ................. | 707/3 |
| 2002/0029227 | A1 * | 3/2002 | Multer et al. ............... | 707/203 |
| 2002/0194205 | A1 * | 12/2002 | Brown et al. ................. | 707/200 |
| 2003/0182315 | A1 * | 9/2003 | Plastina et al. .............. | 707/200 |
| 2004/0242269 | A1 * | 12/2004 | Fadell ...................... | 455/556.2 |
| 2005/0091448 | A1 * | 4/2005 | Nakatani et al. ............ | 711/113 |
| 2006/0015539 | A1 * | 1/2006 | Wolf et al. ................... | 707/201 |
| 2006/0069809 | A1 * | 3/2006 | Serlet ......................... | 709/248 |
| 2006/0106898 | A1 * | 5/2006 | Frondozo et al. ............ | 707/204 |
| 2006/0136472 | A1 * | 6/2006 | Jujjuri et al. ................ | 707/102 |
| 2006/0168126 | A1 * | 7/2006 | Costa-Requena et al. ... | 709/219 |

* cited by examiner

*Primary Examiner*—Hosain T Alam
*Assistant Examiner*—Amy Ng
(74) *Attorney, Agent, or Firm*—Lee & Hayes, PLLC (57) ABSTRACT

A novel system that facilitates monitoring and/or updating data contained within a plurality of network devices. The system includes a file system user interface (UI) that can render a unified representation of the content across multiple stores corresponding to a plurality of disparate network devices. The UI facilitates searching and/or browsing content of a plurality of disparate devices via a single unified experience. Another feature of the invention is that it allows for sharing and/or synchronizing without the use of conventional folders. The invention provides for a metadata-centric view of user content (e.g., files) wherein files can be grouped by type, date, author, etc., without regard to the physical location of the content. Additionally, the invention separates or distinguishes (e.g., decouples) the synchronization of metadata (e.g., author, modification date) from the synchronization of the corresponding data files.

9 Claims, 10 Drawing Sheets

ONLINE STORAGE WITH METADATA-BASED RETRIEVAL

CROSS-REFERENCE TO RELATED APPLICATION(S)

This application claims the benefit of U.S. Provisional Patent Application Ser. No. 60/657,530, filed on Feb. 28, 2005, and entitled "QUERY-BASED NOTIFICATION ARCHITECTURE," the entirety of which is incorporated herein by reference.

TECHNICAL FIELD

This invention is related to computer systems and more particularly to a file management system and/or methodology that facilitates management of local and remote content in a single unified experience.

BACKGROUND OF THE INVENTION

As reliance upon computers become increasingly more commonplace, it is common for computer users to have data and information stored on more than one computer system. For example, it is very common for a user to have a work machine, a laptop, and a home machine. Moreover, many users today employ handheld devices such as personal data assistants and smart phones, which also have data storage capacity.

Conventional desktop user interfaces (UIs) are designed to manage the content of a single machine. In accordance thereto, efforts have been taken to develop a variety of "file synchronization" utilities that assist users in moving their data back and forth between multiple machines and file systems. However, these "file synchronization" utilities do not integrate well with the primary file management UI.

Computer systems which support network-accessible folders allow user to retrieve items from remote machines. However, these limited systems require the user to view remote files as a separate area of the file system. In other words, today, a user cannot easily view and/or search content of a specified group of computers. Modern search systems exist for searching a local machine or for searching the entire Internet, but tools and/or utilities do not exist to allow an end-user to search across a specific set of computers and/or file systems.

What is needed is a file management system and/or methodology that enables a user to view and manage both local and remote content in a single unified experience, using a small set of consistent operations. To that end, a substantial need exists for a system and/or methodology that facilitate the synchronization of metadata and files between disparate machines. More particularly, a substantial need exists for an improved on-line storage architecture.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, in one aspect thereof, is directed to a novel system that facilitates monitoring and/or updating data contained within a plurality of network devices. The system includes a file system user interface (UI) that can render a unified representation of the content across multiple stores corresponding to a plurality of disparate network devices. In other words, the invention can effect display of the overall content maintained in a plurality of network data stores. The UI facilitates searching and/or browsing content of a plurality of disparate devices via a single unified experience. Another feature of the invention is that it allows for sharing and/or synchronizing without the use of conventional folders.

The subject invention provides for a metadata-centric view of user content (e.g., files) wherein files can be grouped by type, date, author, etc. without regard to the physical location of the content. Another novel feature of the subject invention is that it can separate or distinguish (e.g., decouple) the synchronization of metadata (e.g., author, modification date) from the synchronization of the corresponding data files. In one aspect the system can facilitate communication between disparate network devices whereas metadata corresponding to the networked file systems is synchronized. Once the metadata is synchronized, in another aspect, the data file stream can be transferred thereby effecting metadata and file synchronization.

The subject invention enables a user to modify metadata relating to a file without physically transferring the file to a local store. As well, a user can learn about files without actually copying them off a network. Moreover, because the metadata for a file is usually smaller than the file itself, a user can learn about changes to files faster than they would if the file itself was copied. Since the management of metadata is decoupled from the management of the files and the metadata set for each file is of a known size, performance of synchronization can more easily be predicted and managed.

In other aspects, policies (e.g., rules) can be employed to effect and/or automate synchronization of the files separately from the metadata. Rule-based logic and/or artificial intelligence reasoning mechanisms can be employed in connection with the policies. Explicit synchronization systems and/or methodologies can also be employed to effect synchronizing of metadata and/or files between disparate stores.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As discussed supra, an increasingly common scenario is that a computer user maintains data and information on more than one computer system. For example, most users have a computer at home, a computer at work and often a mobile computer such as a laptop or a personal data assistant (PDA). In contrast to the conventional desktop user interfaces (UIs) that are designed to manage content on a single machine, the subject invention is directed to a system that enables a user to manage content across multiple machines via a unified representation of disparate file system.

Additionally, aspects of the subject invention are directed to a metadata and file stream synchronization utility that leverages the unified representation tool and functionality. In other words, the subject invention is directed to a file management UI that allows a user to manage disparate file systems (e.g., local and remote) via a single unified experience. The invention employs a small set of consistent operations to effect the management of the disparate file systems. Moreover, aspects of the subject invention provide for a system that facilitates synchronizing metadata and files between the disparate file systems.

It is to be understood that the subject invention decouples the synchronization of metadata from the file stream. In other words, in one aspect, once the metadata is updated, a user can opt to update the corresponding file stream. The UI can be configured to distinguish the rendering of files that have not been "fetched" into a local store. For example, the UI can be configured to visibly distinguish (e.g., display in different color, font, shading) files, which are not "fetched" onto a local machine. Following is a more detailed description of these and other aspects of the subject invention.

Figure 1:
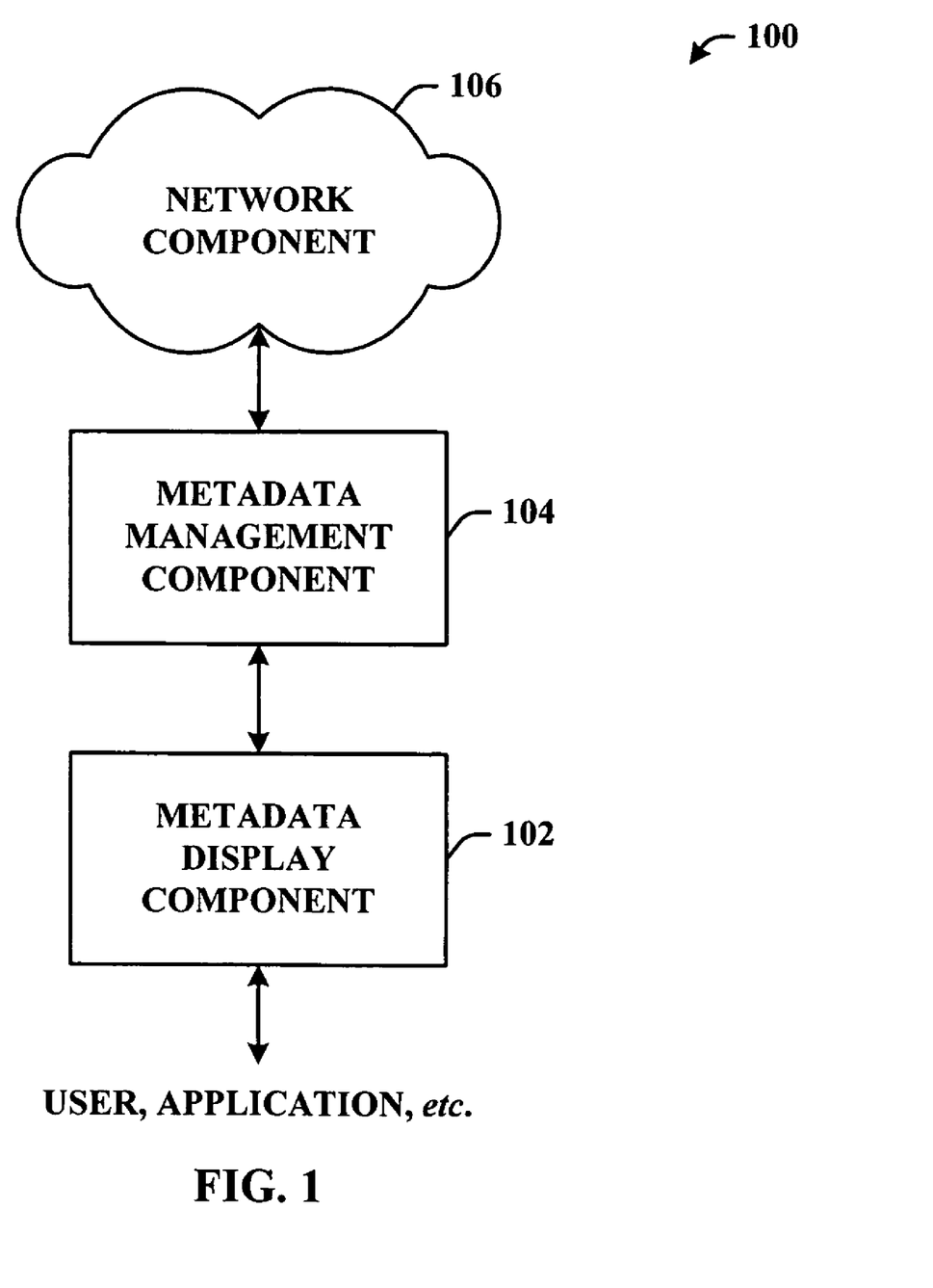
FIG. 1 illustrates a general component block diagram of a system that facilitates metadata management of disparate data stores in accordance with an aspect of the subject invention.

Referring now to FIG. 1, there is illustrated a schematic representation of an aspect of a system 100 that facilitates management of disparate file systems in accordance with the subject invention. Generally, the system 100 can include a metadata display component 102, a metadata management component 104 and a network component 106.

The metadata display component 102 can also be referred to as a file system UI. This metadata display component 102 can provide a unified view of the content across multiple stores. The multiple stores can be accessible via the network component 106. The metadata management component 104 facilitates separating the synchronization of metadata from the synchronization of corresponding data (e.g., file streams) between the members of the network component 106.

The metadata management component 104 together with the metadata display component 102 enable a user to search and/or browse specified data stores included with the network component 106. In other words, the subject invention can provide for a metadata-CENTRIC view of a user accessible network of files. This view can be rendered via the metadata display component 102. Accordingly, the files can be grouped by type, date, author, name, etc. without regard to a physical location of the files. As described supra, the system can distinguish between synchronization of metadata (e.g., author, modification date) and the synchronization of the files themselves.

The invention enables a user to modify metadata on a file without physically moving the file to a local machine. As well, in accordance with aspects, a user can learn about files without copying them from the network component 106. It will be appreciated that, because the metadata for a file is usually smaller than the file itself, a user can usually learn about a change to files faster than if the file itself was copied. The decoupling (e.g., separating synchronization of metadata from synchronization of a file) feature presented in accordance with the subject invention contributes to this efficiency.

Moreover, because the metadata set for each file is of a known size, performance of synchronization can be more easily predicted and managed (via the metadata management component 104).

The metadata management component 104 can include rule-based logic and/or artificial intelligence (AI) based reasoning mechanisms that can automate one or more features of the invention. For example, a user can set a policy (e.g., rule) that instructs the metadata management component 104 to synchronize the files themselves separately from the metadata. More particularly, a policy can be effected that automatically and immediately synchronizes, "files under 1 Mb." It will be appreciated explicit synchronization can also be facilitated. It is further to be appreciated that this invention applies equally to synchronization of a user's own machines as it does to sharing of data between disparate users.

Figure 2:
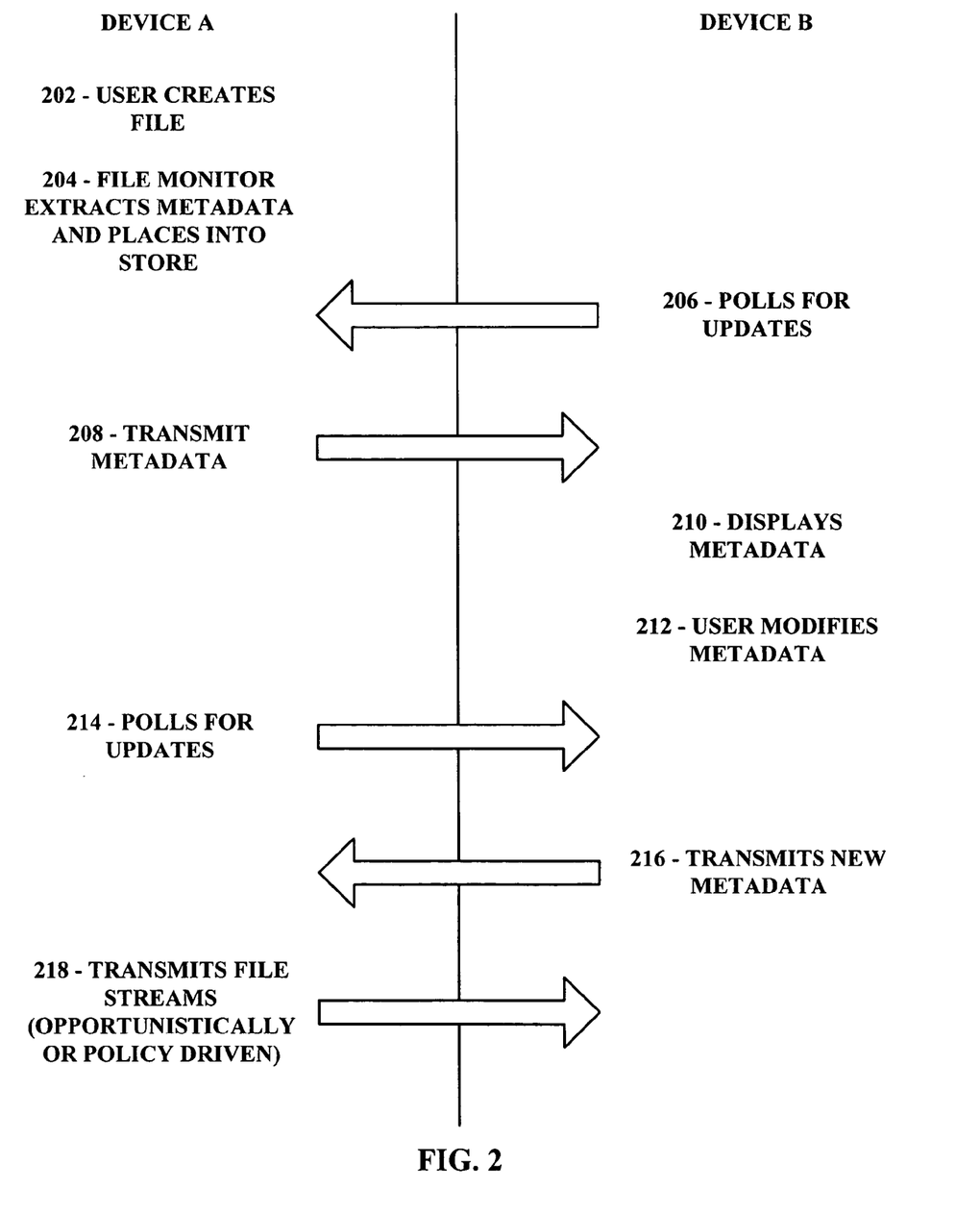
FIG. 2 illustrates an exemplary process flow of procedures to synchronize metadata and corresponding content in accordance with a disclosed aspect.

With reference to FIG. 2, there is illustrated a flow chart in accordance to an aspect of the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

FIG. 2 illustrates an exemplary communication flow between two disparate devices (e.g., Device A and Device B). It is to be understood that Device A and Device B can represent remotely located machines in a single user network. As well, it will be appreciated that Device A and Device B can represent two disparate machines corresponding to shared scenario between two users. In either scenario, Device A and Device B represent two disparate data stores whereby metadata and file synchronization is desired. Although, FIG. 2 illustrates only two disparate devices, it is to be appreciated that network component (106 of FIG. 1) can include any number of disparate devices thus effecting metadata and/or file synchronization.

Referring to FIG. 2 and proceeding to 202, a user can create a file via Device A. At 204, a file monitor can extract and store the metadata associated to the file. Device B polls for updates at 206. In accordance thereto, Device A transmits the updated metadata at 208. It will be understood that this process can be employed in any manner known in the art. As well, it will be appreciated that metadata can be transferred between disparate devices via any polling (e.g., requesting) method. For example, in an alternate aspect, Device B can request all metadata from Device A that was created in a predetermined timeframe. In another embodiment, Device B can request all metadata from Device A that corresponds to a predetermined file type.

At Device B, the metadata can be displayed (at 210). As described supra, the invention can effect a unified representation of content maintained within the disparate stores. Returning to the example, at 210, Device B can display a unified representation of content maintained in Device A and Device B. At 212, the user can modify the metadata.

At 214, Device A can poll (e.g., request) for updates to metadata from Device B. Again, it is to be appreciated that rule-based logic and/or AI-based reasoning can be employed to effect the polling (e.g., monitoring, requesting) of Device B. New (e.g., updated, imported) metadata can be transferred to Device A at 216. Once Device A receives the updated metadata, the file stream can be transmitted to Device B at 218. As will be discussed in greater detail infra, it is to be appreciated that the transfer of the file stream can be based upon opportunistic criteria, policy-driven (e.g., rule-based logic) and/or AI-reasoning. These alternate aspects will be discussed in greater detail with reference to FIGS. 6-9 below.

Figure 3:
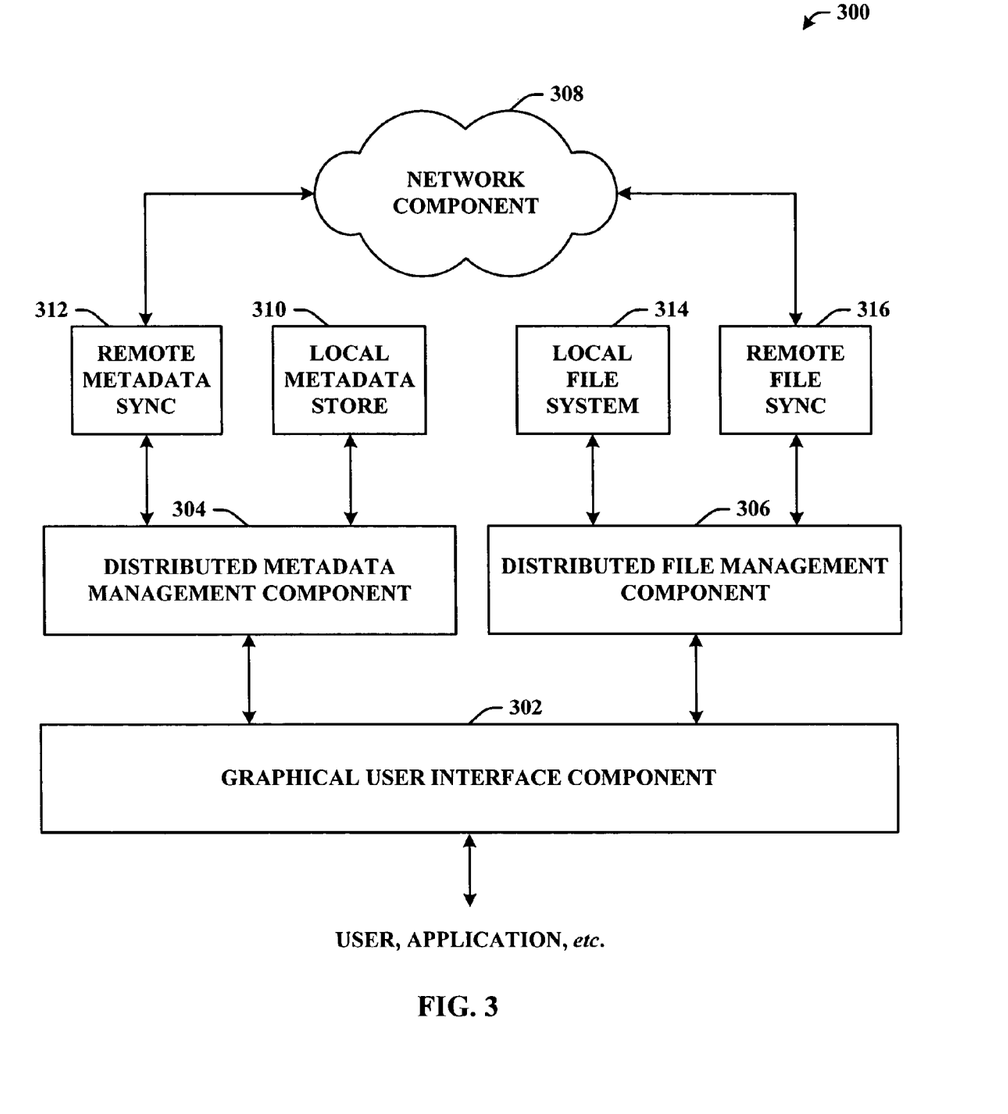
FIG. 3 is a general block diagram of an exemplary aspect that illustrates a decoupling of metadata management and file management components in accordance with an aspect of the subject invention.

Referring now to FIG. 3, there is illustrated a schematic representation of an alternative aspect of a system 300 that facilitates management of disparate file systems in accordance with the subject invention. Generally, system 300 includes a graphical user interface (GUI) component (e.g., metadata display component) 302, distributed metadata management component 304, distributed file management component 306 and a network component 308. Additionally, FIG. 3 illustrates a remote metadata synchronization component 310 and a remote file synchronization component 312.

As described with reference to FIG. 2 supra, the GUI component 302 can effect rendering a unified representation of content maintained within disparate file systems included within or accessible via the network component 308. It is to be appreciated that multiple disparate file systems are accessible via network component 308.

In operation, a user can view a unified representation (via GUI 302) of the content maintained within the disparate file systems of the network component 308. In doing do, the distributed metadata management component 304 can access metadata from a local metadata store 310 thus effecting the rendering of the unified representation via GUI component 302. As described with reference to FIG. 2, the distributed management component 304 can employ a remote metadata synchronization component 312 to access and/or synchronize metadata between devices (e.g., file systems). The remote metadata synchronization component 310 is in communication with the network component 308.

Similarly, a local file system 314 and remote file synchronization component 316 can be employed to synchronize a file between a local device and a networked device (e.g., via network component 308). As illustrated, it is to be appreciated that the aspect of the subject invention illustrated in FIG. 3 employs separate components to facilitate the functionality of metadata and file management (e.g., synchronization). In other words, it is a novel feature of the subject invention to decouple the synchronization of metadata from the synchronization of the corresponding file streams. Although the distributed management components (304, 306), the remote synchronization components 310, 316 and the local stores (314, 314) are illustrated as separate components, it is to be understood and appreciated that any of these components can be combined into common components without departing from the scope and functionality of the subject invention. For example, in an alternative aspect, a single distributed management component (not shown) could be employed that can facilitate decoupled management of operations and procedures with respect to metadata and files as described supra.

Figure 4:
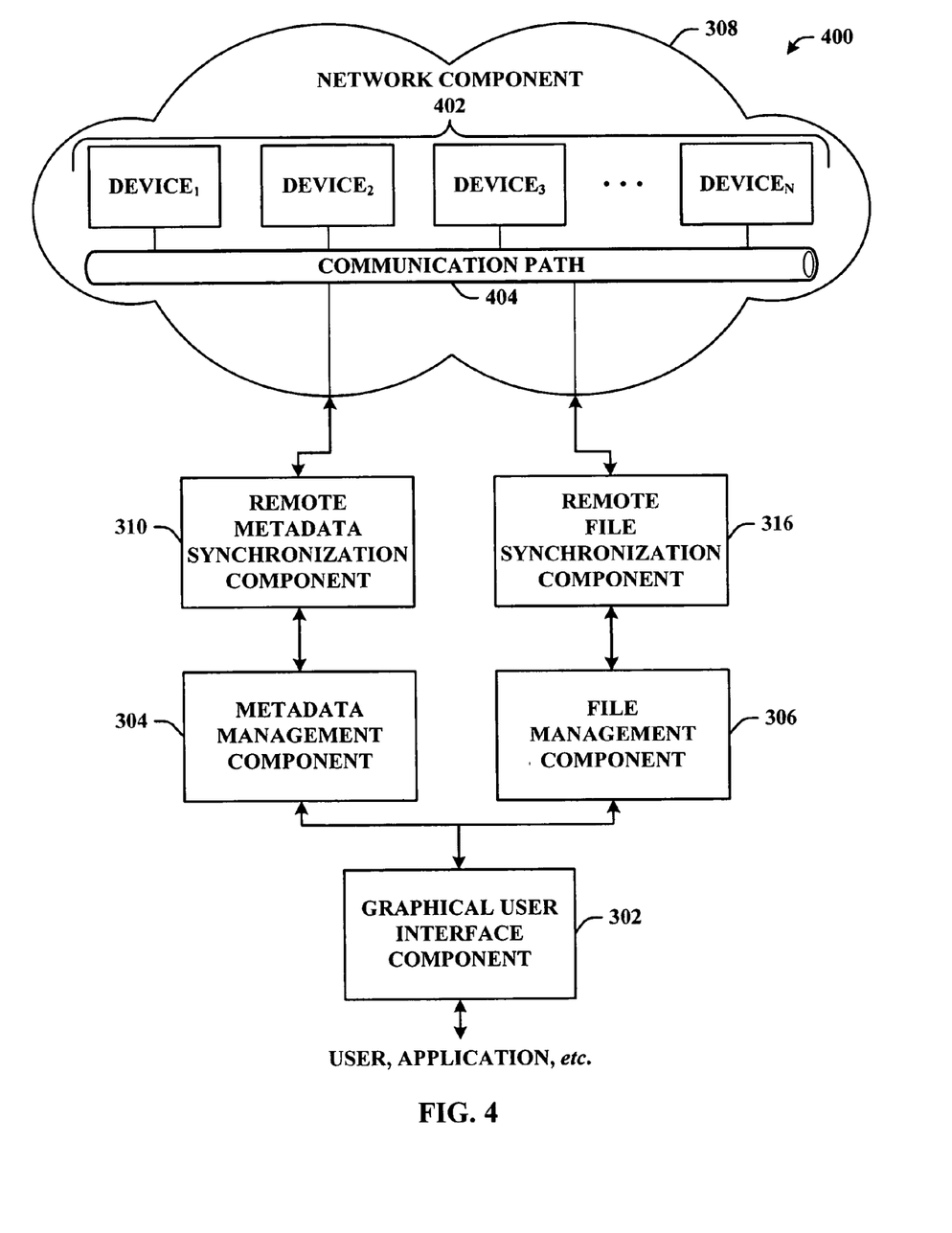
FIG. 4 is a general block diagram that illustrates an exemplary network component in accordance with an aspect of the subject invention.

Referring now to FIG. 4, there is illustrated a schematic representation of an alternate aspect of a system 400 that facilitates synchronization of metadata and/or files with respect to network component 308. Generally, the system 400 can include a GUI component 302, a distributed metadata management component 304, a distributed file management component 306 and a network component 308. Further, system 400 can include a remote metadata synchronization component and a remote file synchronization component 316. It is to be appreciated that these aforementioned components have the same functionality as described with reference to FIG. 3.

As illustrated in FIG. 4, the network component 308 can include device components 1 to N, where N is an integer. Device components 1 to N can be referred to collectively or individually as device components 402. In accordance with aspects of the subject invention, device component 402 can represent any network device(s). By way of example, device components 402 can include, but are not limited to include, a desktop computer, laptop, server, personal data assistant, smart phone, or the like. A communication path 404 is illustrated and representative of a metadata bus that facilitates transfer of metadata between device components 402. The communication path 404 can facilitate synchronization between device components 402 upon a change in metadata.

As discussed supra, in alternative aspects and by way of further example, the management components 304, 306, and synchronization components 310, 316, can be configured with a decision-making mechanism in the form of a rule engine whereby a rule can be applied thus effecting management and/or synchronization of the metadata and/or corresponding files. In an alternate embodiment, an AI component can be employed individually or in combination with other evaluation schemes in order to effect automation of the management and/or synchronization components based on an inference of a user intention with respect to the component(s) (e.g., 304, 306, 310, 316). These alternative aspects will be discussed in greater detail with respect to FIGS. 6-9 infra.

Figure 5:
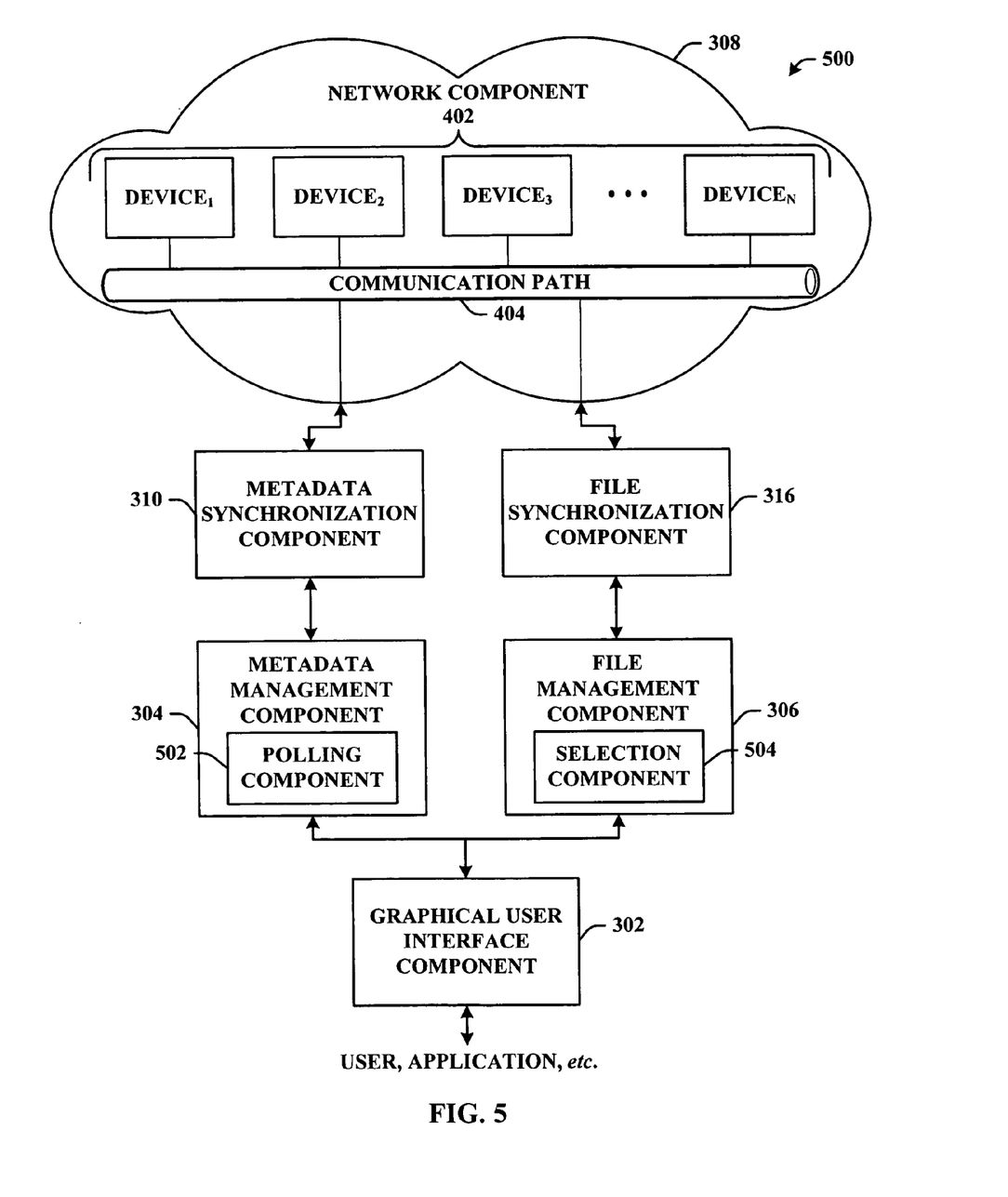
FIG. 5 illustrates a general block diagram that employs a polling component and a selection component in accordance with a disclosed aspect.

FIG. 5 illustrates yet another aspect of the subject invention. Generally, system 500 can include a GUI component 302, management components 304, 306, synchronization components 310, 316 and network component 308. These components (302, 304, 306, 308, 310, 316) have the same functionality as described supra. In addition, system 500 can include a polling component 502 and a selection component 504.

Illustrated in FIG. 5, the metadata management component 304 can include the polling component 502. The polling component 502 can facilitate communicating to the device components 402 with respect to updated metadata. As previously described, the metadata management component 304 can employ the polling component 502 to effect a determination of the arrival of new or modified metadata with respect to content. In alternate aspects, the network devices 402 can automatically report new and/or modified metadata to the management component 304.

The file management component 306 can employ the selection component 504 to effect synchronization of a file stream that corresponds to the synchronized metadata. In other words, once the metadata synchronization component 310 updates metadata, the selection component 504 can be employed to initiate synchronization of the corresponding file stream(s). It is to be appreciated that the selection component 504 further demonstrates the decoupling of the metadata synchronization from the file stream synchronization.

Figure 6:
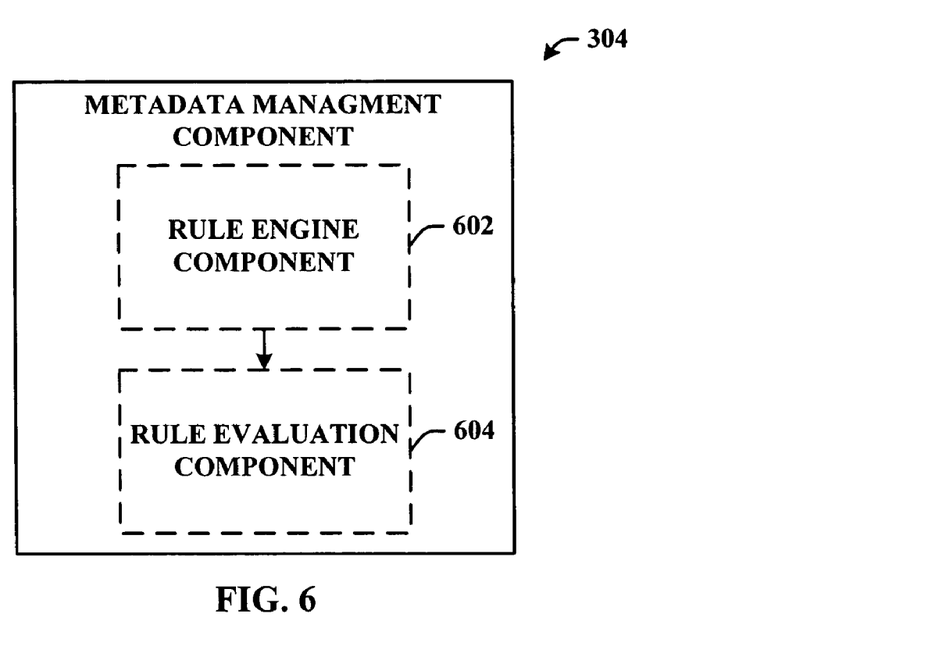
FIG. 6 illustrates a metadata management component including rule-based mechanisms in accordance with an aspect of the invention.

With reference now to FIG. 6, an alternate aspect of metadata management component 304 (FIG. 3) is shown. More particularly, metadata management component 304 generally includes a rule engine component 602 and a rule evaluation component 604. In accordance with this alternate aspect, an implementation scheme (e.g., rule) can be applied to poll for updates and/or effect synchronization of metadata. It will be appreciated that the rule-based implementation can automatically and/or dynamically poll for metadata updates. In response thereto, the rule-based implementation can update the metadata by employing a predefined and/or programmed rule(s) based upon any desired criteria (e.g., file type, file size).

By way of example, a user can establish a rule that can automatically poll for metadata updates that correspond to a preferred type of file (e.g., music). In this exemplary aspect, the rule can be constructed to poll a targeted data store or source location for all music files. Accordingly, metadata associated therewith can be extracted. Once extracted, the metadata can be synchronized (via synchronization component). It will be appreciated that any of the specifications utilized in accordance with the subject invention can be programmed into a rule-based implementation scheme.

Figure 7:
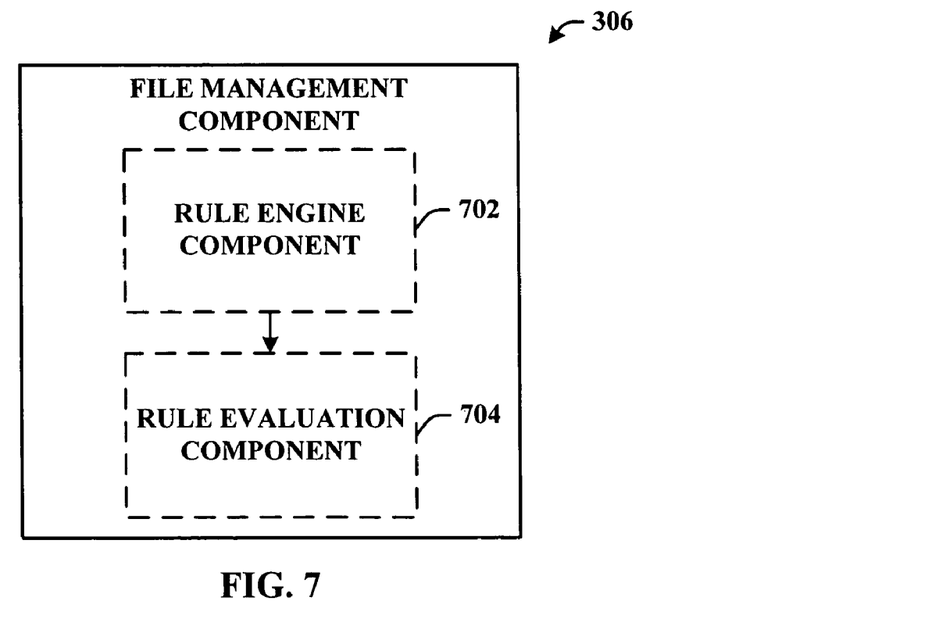
FIG. 7 illustrates a file management component including rule-based mechanisms in accordance with an aspect of the invention.

Once the updated metadata is synchronized, a rule can be employed to effect synchronization of the file that corresponds to the metadata. FIG. 7 illustrates a file management component 306 that can facilitate automated synchronization of the file. More particularly, the file management component 306 can include a rule engine component 702 and a rule evaluation component 704.

In the exemplary aspect of FIG. 7, the rule engine component 702 can be programmed or configured in accordance with a user-defined preference (e.g., policy, rule). By way of example, a rule can be established to automatically synchronize files of a specified type (e.g., music) or size (e.g., greater than 1 Mb). As well, a rule can be established in accordance with a specific hardware configuration. By way of further example, a rule can be constructed in accordance with specific memory capacity of a device. In other words, a rule can be established to take into consideration the specific limitations of a hardware device (e.g., storage capacity). Thus, in one aspect, if a specific handheld device has low memory capacity, a rule can be generated to ignore and not synchronize files that exceed a predefined size threshold. The rule evaluation component 704 facilitates application of the rule.

Figure 8:
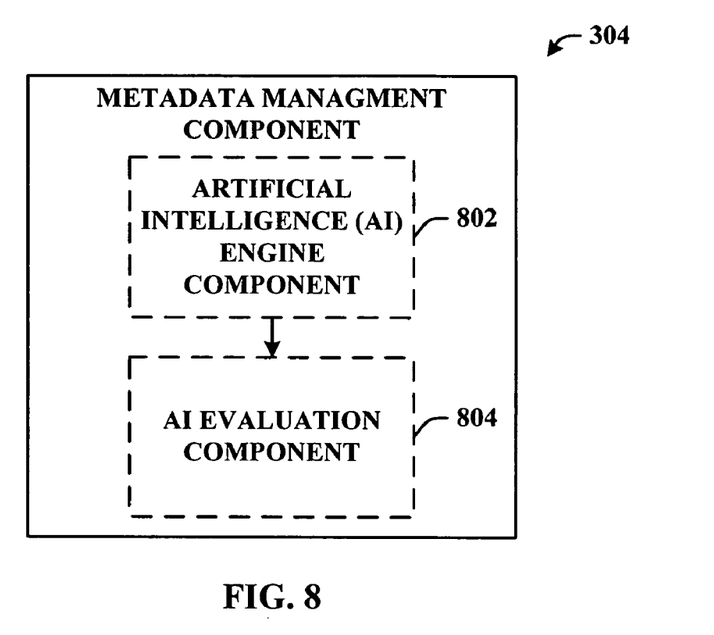
FIG. 8 illustrates a metadata management component including artificial intelligence-based mechanisms in accordance with an aspect of the invention.

A schematic diagram of another alternative aspect of the metadata management component 304 is illustrated in FIG. 8. In addition to or in replace of the rule-based components described with reference to FIG. 6, the metadata management component 304 can include an artificial intelligence (AI) engine component 802 and an AI evaluation component 804.

In accordance with this aspect, the optional AI engine and evaluation components 802, 804 can facilitate automatically effecting various aspects of the metadata management component 304. The AI components 802, 804 can optionally include an inference component (not shown) that can further enhance automated aspects of the AI components utilizing, in part, inference based schemes to facilitate inferring intended actions to be performed at a given time and state. The AI-based aspects of the invention can be effected via any suitable machine-learning based technique and/or statistical-based techniques and/or probabilistic-based techniques.

In the alternate aspect, as further illustrated by FIG. 8, the subject metadata management component 304 (e.g., in connection with polling for updated metadata) can optionally employ various artificial intelligence based schemes for automatically carrying out various aspects thereof. Specifically, an artificial intelligence engine and evaluation components 802, 804 can optionally be provided to implement aspects of the subject invention based upon artificial intelligence processes (e.g., confidence, inference). For example, a process for determining polling criteria of metadata updates based upon content of a data store(s) and/or target device(s) can be facilitated via an automatic classifier system and process.

Figure 9:
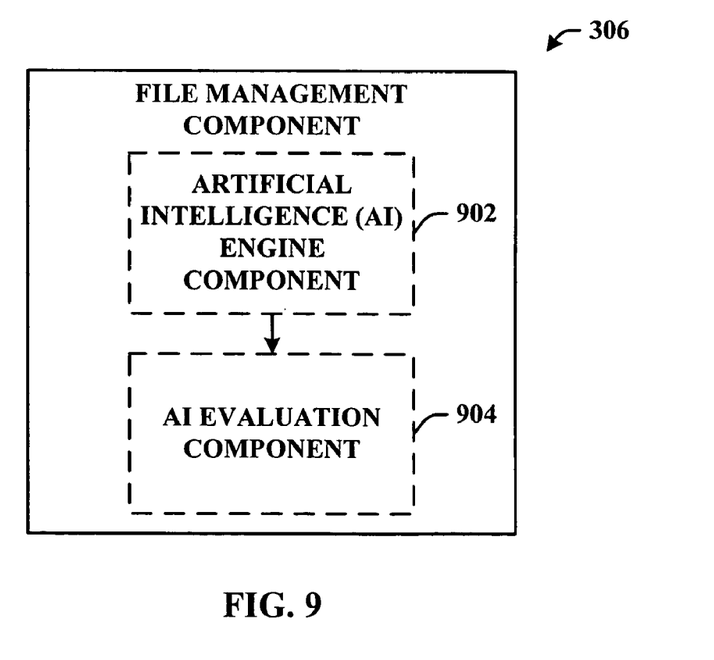
FIG. 9 illustrates a file management component including artificial intelligence-based mechanisms in accordance with an aspect of the invention.

With reference to FIG. 9, an optional artificial intelligence engine and evaluation components 902, 904 can be employed in accordance with file management component 306. These components (802, 804) can facilitate an automated process of synchronizing in accordance with hardware specifications and/or inferred user preferences. For example, in one aspect, the file management component 306 of FIG. 9 can facilitate synchronizing files that exceed a specified size (e.g., files greater than 1 Mb) or files that match a specific type (e.g., music).

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of data component association, for example, attributes can be file types or other data-specific attributes derived from the file types and/or contents, and the classes can be categories or areas of interest.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the invention can employ classifiers that are explicitly trained (e.g., via a generic training data) as well as implicitly trained (e.g., via observing user behavior, receiving extrinsic information). For example, SVM's can be configured via a learning or training phase within a classifier constructor and feature selection module. In other words, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

Figure 10:
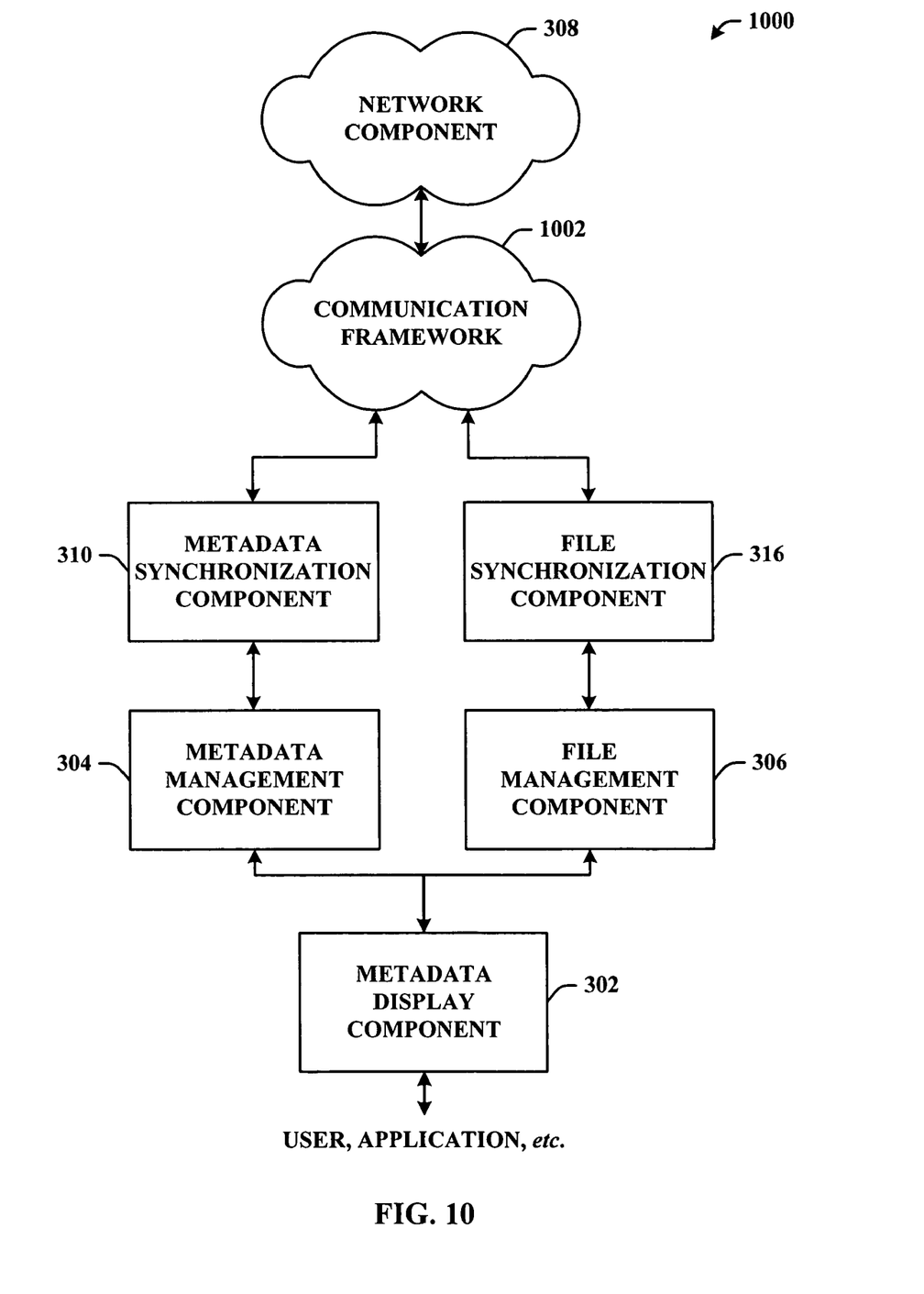
FIG. 10 illustrates a component diagram of an exemplary computing environment in accordance with an aspect of the subject invention.

Referring to FIG. 10, a schematic block diagram of an exemplary computing environment is shown in accordance with an aspect of the subject invention. Specifically, the system 1000 illustrated includes a metadata display component 302 (e.g., GUI), management components 304, 306 and synchronization components 310, 316. These components can have the same functionality as discussed in detail supra. Additionally, the system 1000 illustrated employs a communication framework 1002 whereby the aforementioned components can remotely communicate with the network component 308. It will be appreciated that communication framework 1002 can employ any communications technique (wired and/or wireless) known in the art. For example, communications framework 1002 can include, but is not limited to, Bluetooth™, Infrared (IR), Wi-Fi, Ethernet, or the like.

Figure 11:
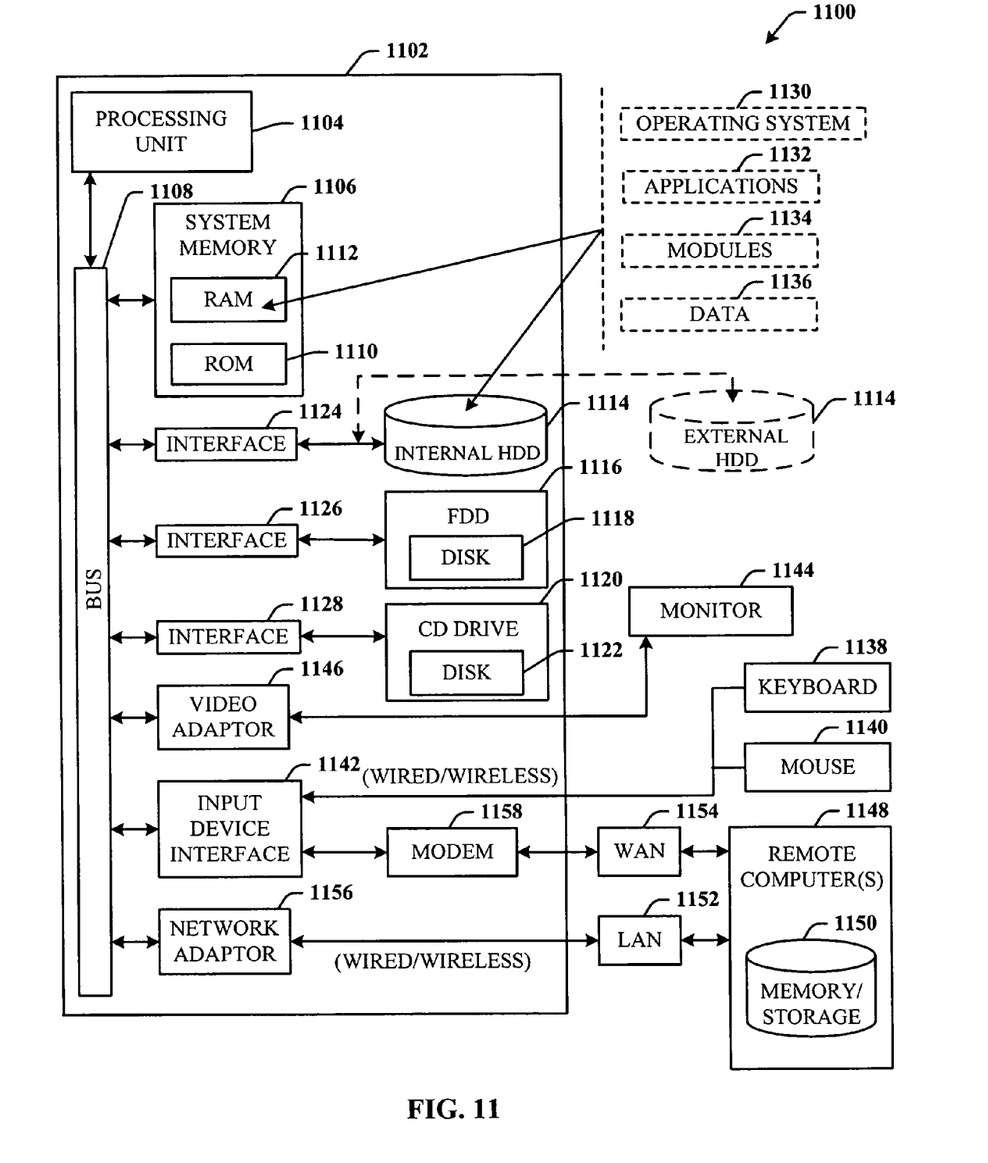
FIG. 11 illustrates a block diagram of a computer operable to execute the disclosed architecture.

Referring now to FIG. 11, there is illustrated a block diagram of a computer operable to execute the disclosed architecture. In order to provide additional context for various aspects of the subject invention, FIG. 11 and the following discussion are intended to provide a brief, general description of a suitable computing environment 1100 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, there is illustrated an exemplary environment 1100 for implementing various aspects of the invention that includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read only memory (ROM) 1110 and random access memory (RAM) 1112. A basic input/output system (BIOS) is stored in a nonvolatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the subject invention can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156. When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
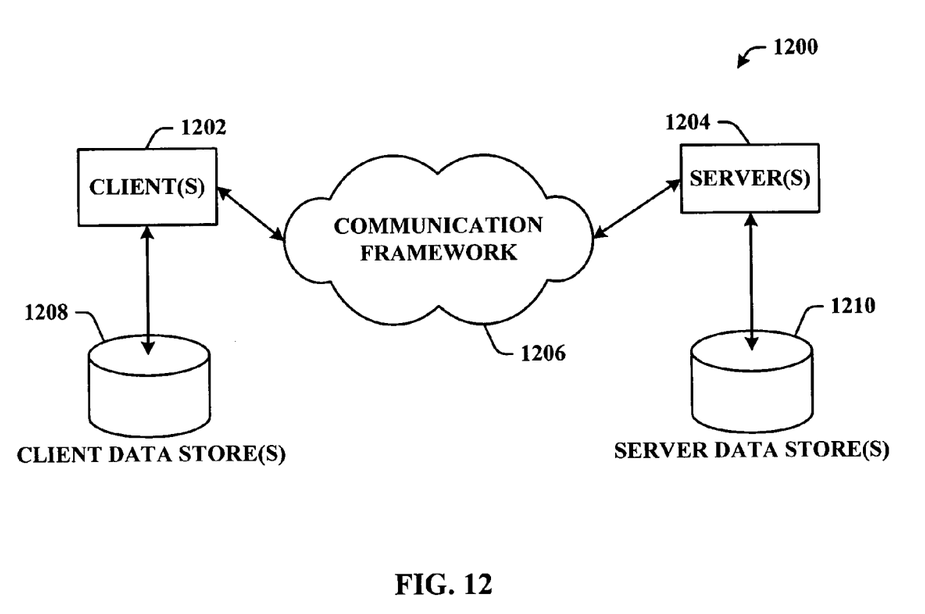
FIG. 12 illustrates a schematic block diagram of an exemplary computing environment in accordance with the subject invention.

Referring now to FIG. 12, there is illustrated a schematic block diagram of an exemplary computing environment 1200 in accordance with the subject invention. The system 1200 includes one or more client(s) 1202. The client(s) 1202 can be hardware and/or software (e.g., threads, processes, computing devices). The client(s) 1202 can house cookie(s) and/or associated contextual information by employing the subject invention, for example. The system 1200 also includes one or more server(s) 1204. The server(s) 1204 can also be hardware and/or software (e.g., threads, processes, computing devices). The servers 1204 can house threads to perform transformations by employing the subject invention, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates updating data, the system comprising:
    a component embodied on a computer-readable storage medium that facilitates rendering on a local device a unified representation of content maintained within a plurality of network devices, wherein the unified representation is based upon locally stored metadata of the content and facilitates grouping the local representation of the content according to type, date, and author associated with the content independent of network locations of the content;
    a management component embodied on a computer-readable storage medium that polls at least one of the plurality of network devices for an update to the metadata that corresponds to a data item included in the content, wherein the management component receives a metadata update request from one of the plurality of network devices via a metadata communication path that provides a metadata transfer path between the plurality of network devices, wherein the metadata transfer path comprises a metadata bus dedicated to communication of metadata; and
    a synchronization component embodied on a computer-readable storage medium that synchronizes the locally stored metadata in accordance with the update without synchronizing the corresponding data file to the local device, wherein the synchronization component allows a user at the local device to modify the locally stored metadata and synchronize the modified metadata to the network device storing the corresponding data item, wherein the synchronization component transfers the updated metadata in response to the metadata update request from the one of the plurality of network devices, wherein the one of the plurality of network devices streams a data file that corresponds to the updated metadata independent of metadata.

2. The system of claim 1, the one of the plurality of network devices streams the data file in response to a prompt from the management component.

3. The system of claim 2, the management component comprises:
    a rule engine component that allows a user to establish a rule defining synchronization criteria; and
    a rule evaluation component that applies the rule to synchronize the data file that corresponds to the updated metadata when the data file satisfies the synchronization criteria.

4. The system of claim 2, the management component comprises an artificial intelligence component that predicts a user intention as a function of historical criteria.

5. The system of claim 4, the artificial intelligence component comprises an inference component that facilitates automatic data file synchronization as a function of the predicted user intention.

6. The system of claim 1, further comprising a user interface that displays the unified representation of content maintained within the plurality of network devices.

7. A computer-implemented method for monitoring data, the method comprising:
    displaying a unified representation of content contained within a plurality of disparate data stores, the unified representation of content is based upon locally stored metadata of the content and facilitates grouping the representation of the content according to type, date, and author of the content independent of locations of the content;
    polling for an update of metadata corresponding to a subset of the content;
    synchronizing the updated metadata from a first data store to a second data store without synchronizing the corresponding data files from the first data store to the second data store;
    modifying the synchronized metadata stored on the second data store, the modified metadata corresponding to content that is stored on the first data store and not stored on the second data store;
    updating the metadata stored on the first data store in accordance with the modification via a synchronization process; and
    synchronizing a data item that corresponds to the updated metadata in accordance with a user-defined policy, the policy defines which data items are to be synchronized as a function of one or more data item attributes, wherein the data item is synchronized without concurrently synchronizing the metadata.

8. The method of claim 7, further comprising synchronizing a data item that corresponds to the updated metadata in accordance with a user preference.

9. The method of claim 7, further comprising predicting a user action and synchronizing a data item that corresponds to the updated metadata in accordance with the predicted user action.

\* \* \* \* \*